US010042428B2

(12) United States Patent
Cheng et al.

(10) Patent No.: US 10,042,428 B2
(45) Date of Patent: Aug. 7, 2018

(54) NON-TOUCH CONTROL APPARATUS AND CONTROL METHOD THEREOF (71) Applicants: BOE TECHNOLOGY GROUP CO., LTD., Beijing (CN); BEIJING BOE MULTIMEDIA TECHNOLOGY CO., LTD., Beijing (CN)

(72) Inventors: Peng Cheng, Beijing (CN); Shuhuan Yu, Beijing (CN); Jinglu Bai, Beijing (CN); Junning Su, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 15/160,512

(22) Filed: May 20, 2016

(65) Prior Publication Data

US 2016/0349852 A1    Dec. 1, 2016

(30) Foreign Application Priority Data

May 28, 2015    (CN) .......................... 2015 1 0282889

(51) Int. Cl.
  *G06F 3/043*    (2006.01)
  *G06F 3/01*    (2006.01)
(52) U.S. Cl.
  CPC .... *G06F 3/017* (2013.01); *G06F 2203/04108* (2013.01)
(58) Field of Classification Search
  CPC ........ G06F 3/043–3/0436; G06F 3/017; G06F 3/041–3/0412; G06F 2203/04108

(Continued)

(56) References Cited

U.S. PATENT DOCUMENTS

2012/0194483 A1*  8/2012  Deluca ................. G06F 1/1643
                                                        345/177
2012/0206339 A1*  8/2012  Dahl ...................... G06F 3/043
                                                        345/156

(Continued)

FOREIGN PATENT DOCUMENTS

CN    103531136 A    1/2014
CN    104571703 A    4/2015

OTHER PUBLICATIONS

The First Chinese Office Action dated May 31, 2017; Appln. No. 201510282889.1.

*Primary Examiner* — Roberto Flores
(74) *Attorney, Agent, or Firm* — Ladas & Parry LLP (57) ABSTRACT An embodiment of the present disclosure provides a non-touch control apparatus, including: a main control integrated circuit, an ultrasonic generating circuit, a first transducer device and a second transducer device, wherein the main control integrated circuit is configured to, in response to a condition that the device is in a non-touch control mode, switch on the ultrasonic generating circuit so as to control the second transducer device to send out a first acoustic wave signal, the first transducer device is configured to be capable of receiving a second acoustic wave signal including the first acoustic wave signal, converting the second acoustic wave signal into a first electric signal, and outputting the first electric signal, wherein, the main control integrated circuit is configured to be capable of receiving a second electric signal derived from the first electric signal.

15 Claims, 4 Drawing Sheets (58) Field of Classification Search
USPC .................. 345/173, 177, 178; 178/18.04
See application file for complete search history.

(56) References Cited

U.S. PATENT DOCUMENTS

| | | | |
|---|---|---|---|
| 2012/0274610 A1* | 11/2012 | Dahl | G06F 3/0436 345/177 |
| 2013/0120323 A1* | 5/2013 | Scharff | G06F 3/043 345/177 |
| 2013/0127783 A1* | 5/2013 | Lee | G06F 3/043 345/175 |
| 2013/0272041 A1* | 10/2013 | Cheng | H03K 17/962 363/84 |
| 2014/0022189 A1* | 1/2014 | Sheng | H04R 3/00 345/173 |
| 2015/0102994 A1 | 4/2015 | Ni | |
| 2016/0092714 A1* | 3/2016 | Yazdandoost | G06K 9/0002 345/177 |
| 2016/0202788 A1* | 7/2016 | Hunt | G06F 3/0436 345/177 |
| 2016/0345113 A1* | 11/2016 | Lee | G01S 15/04 |

\* cited by examiner

NON-TOUCH CONTROL APPARATUS AND CONTROL METHOD THEREOF

TECHNICAL FIELD

Embodiments of the present disclosure relate to a non-touch control apparatus and a control method thereof.

BACKGROUND

In a related art, in order to achieve identification and position tracking of a gesture on a monitoring display screen, a camera is added on the display screen or an infrared technology is adopted to carry out identification and position tracking of the gesture. However, the camera and the infrared technology are relatively high in cost, and a hole or an opening needs to be formed on the display screen, which influences aesthetics of overall design.

In short, in the prior art, position tracking of gesture can be achieved by mounting a camera or other external devices on the display screen so as to achieve user command input, thereby increasing cost of a device, and influencing aesthetics of the device.

SUMMARY

An embodiment of the present disclosure provides a non-touch control apparatus, comprising: a main control integrated circuit, an ultrasonic generating circuit, a first transducer device and a second transducer device, wherein the main control integrated circuit is configured to, in response to a condition that the device is in a non-touch control mode, switch on the ultrasonic generating circuit so as to control the second transducer device to send out a first acoustic wave signal, the first transducer device is configured to be capable of receiving a second acoustic wave signal including the first acoustic wave signal, converting the second acoustic wave signal into a first electric signal, and outputting the first electric signal, wherein, the main control integrated circuit is configured to be capable of receiving a second electric signal derived from the first electric signal.

Another embodiment of the present disclosure provides a method for controlling the above non-touch control apparatus, comprising:

by the main control integrated circuit, switching on the ultrasonic generating circuit, when the device is in a non-touch control mode;

by the ultrasonic generating circuit, controlling the second transducer device to generate and send a first acoustic wave signal;

by the first transducer device, receiving acoustic wave signal, converting the acoustic wave signal into the first electric signal, and outputting the first electric signal; and by the main control integrated circuit, receiving second electric signal derived from the first electric signal, judging whether an ultrasonic electric signal is included in the second electric signal, comparing whether a frequency of the ultrasonic electric signal is the same with a preset frequency if the ultrasonic electric signal is included in the second electric signal, and determining a generation position of the ultrasonic wave corresponding to the ultrasonic electric wave if the frequency of the ultrasonic electric signal is different from the preset frequency.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

The embodiments of the present disclosure provide a non-touch control apparatus and a control method thereof, so as to achieve non-touch control. The device not only can be in a loudspeaker working mode, but also can be in a non-touch control mode. The device can track a position of a gesture so as to achieve user command input without adding an external device and a touch screen, thereby facilitating reducing cost of the device and improving aesthetics of the device.

Figure 1:
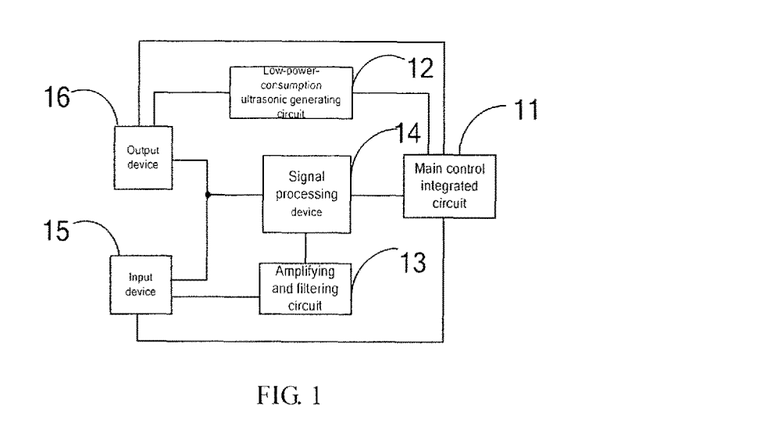
FIG. 1 is a structural schematic diagram of a non-touch control all-in-one machine provided by an embodiment of the present disclosure.

With reference to FIG. 1, a non-touch control all-in-one machine provided by an embodiment of the present disclosure comprises: a main control integrated circuit 11, a low-power-consumption ultrasonic generating circuit 12, an amplifying and filtering circuit 13, a signal processing device 14, an input device 15 (as an example of the first transducer device) constituted by at least one first piezoelectric ceramic device, and an output device 16 (as an example of a second transducer device) formed by at least one second piezoelectric ceramic device. For example, low-power-consumption ultrasonic generating circuit 12 has a power range of 30 W~60 W.

The main control integrated circuit 11 is configured to:

in response to a condition that the all-in-one machine is in the loudspeaker mode, control the low-power-consumption ultrasonic generating circuit 12 to be switched off, and control the at least one first piezoelectric ceramic device and/or the at least one second piezoelectric ceramic device to be in an electro-acoustic conversion mode; and in response to a condition that the all-in-one machine is in the non-touch control mode, control the low-power-consumption ultrasonic generating circuit 12 to be switched on, control the at least one first piezoelectric ceramic device to be in an acoustic-electro conversion mode, and control the at least one second piezoelectric ceramic device to be in the electro-acoustic conversion mode.

Figure 2:
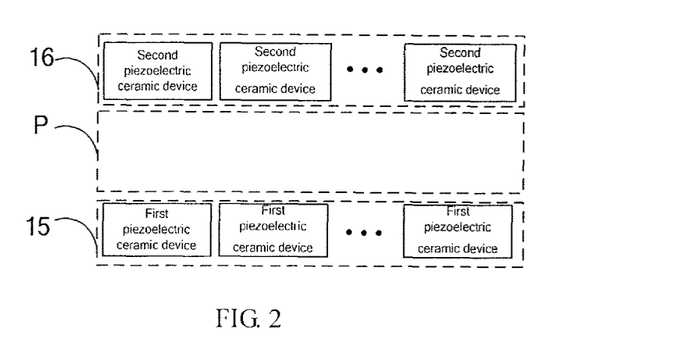
FIG. 2 is a structural schematic diagram of an input device and an output device in the non-touch control all-in-one machine provided by the embodiment of the present disclosure.

For example, the input device and the output device provided by the embodiment of the present disclosure are arranged oppositely, and with reference to FIG. 2, a region between the input device and the output device is a detection region P. When a gesture action occurs in the detection region, the input device receives an acoustic wave signal. The acoustic wave signal includes an ultrasonic wave or controlled sound and interfering sound. For example, the main control integrated circuit determines a generation position of a gesture in the detection region, according to a frequency of an ultrasonic signal received by the input device. The number of the first piezoelectric ceramic devices included in the input device is not specifically limited, and the number of the second piezoelectric ceramic devices included in the output device is also not specifically limited. The first piezoelectric ceramic device and the second piezoelectric ceramic device can be of a same structure. In such case, in order to distinguish a difference in functions of the input device 15 and the output device 16, the piezoelectric ceramic device of the input device is defined as the first piezoelectric ceramic device, and the piezoelectric ceramic device of the output device is defined as the second piezoelectric ceramic device.

The piezoelectric ceramic device provided by the embodiment of the present disclosure is relatively light and thin, thus can be laid out according to a practical application and not influenced by a size of a screen. A 180-degree view field is formed in the detection region between the first piezoelectric ceramic device in the input device and the second piezoelectric ceramic device in the output device, so that no blind spots exist in the detection region, and the non-touch control all-in-one machine is more convenient to use. It should be noted that the non-touch control all-in-one machine in the embodiment and in subsequent embodiments are examples of a non-touch control apparatus. It should be understood that under a condition that the non-touch control apparatus comprising corresponding devices and circuits is of a divided structure, the corresponding advantageous technical effects also can be achieved.

The non-touch control all-in-one machine provided by the embodiment of the present disclosure adopts two working modes, one working mode is the loudspeaker mode, and the other working mode is the non-touch control mode. The priorities of the two working modes can be set by a user according to practical application. The main control integrated circuit can identify which working mode the all-in-one machine is in.

According to the non-touch control all-in-one machine provided by the embodiment of the present disclosure, when the main control integrated circuit determines the all-in-one machine is in the loudspeaker mode, by controlling the first piezoelectric ceramic device and/or the second piezoelectric ceramic device to be in the electro-acoustic conversion mode, the first piezoelectric ceramic device and/or the second piezoelectric ceramic device is used as loudspeakers for outputting an audio so as to achieve the loudspeaker working mode of the all-in-one machine; and when the main control integrated circuit determines the all-in-one machine is in the non-touch control mode, by controlling the low-power-consumption ultrasonic generating circuit to be switched on, controlling the first piezoelectric ceramic device to be in the acoustic-electro conversion mode and controlling the second piezoelectric ceramic device to be in the electro-acoustic conversion mode, so that the second piezoelectric ceramic device is used as ultrasonic generating apparatus, and the first piezoelectric ceramic device is used as ultrasonic receiving apparatus. When the gesture action occurs in the detection region between the input device and the output device, the position of the gesture is tracked so as to achieve user command input and complete the non-touch control mode of the all-in-one machine, thereby facilitating reducing cost of the device and improving aesthetics of the device.

Figure 3:
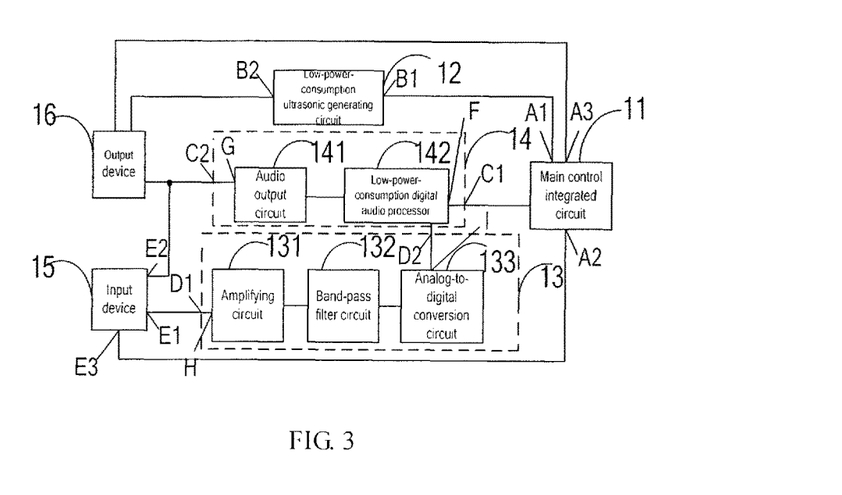
FIG. 3 is a structural schematic diagram of the non-touch control all-in-one machine provided by an embodiment of the present disclosure.

With reference to FIG. 3, in the non-touch control all-in-one machine provided by the embodiment of the present disclosure, the signal processing device 14, for example, includes: an audio output circuit 141 and a low-power-consumption digital audio processor 142; and the amplifying and filtering circuit 13, for example, includes: an amplifying circuit 131, a band-pass filter circuit 132 and an analog-to-digital conversion circuit 133. For example, low-power-consumption digital audio processor 142 has a power range of 80 mW~200 mW.

When the all-in-one machine is in the loudspeaker mode:

For example, the main control integrated circuit 11 is configured for sending an audio to the signal processing device 14;

For example, the signal processing device 14 is configured for outputting the audio by the input device 15 and/or the output device 16 after carrying out amplifying processing on the audio, Wherein the low-power-consumption digital audio processor 142 is configured for forming an amplified audio after carrying out amplifying processing on the received audio and sending the amplified audio to the audio output circuit 141, and the audio output circuit 141 is configured for converting the amplified audio into an analog signal and sending the analog signal to the input device 15 and/or the output device 16; and The input device 15 and/or the output device 16 can be used as the loudspeaker for converting the analog signal into the acoustic wave signal to output.

For example, in the embodiment of the present disclosure, the audio, the digital signal and the analog signal is all in an electric signal form.

It should be noted that when the all-in-one machine is in the loudspeaker mode, the input device 15 can be separately controlled as the loudspeaker to convert the analog signal into the acoustic wave signal to output; the output device 16 also can be separately controlled as the loudspeaker to convert the analog signal into the acoustic wave signal to output; or the input device and the output device are simultaneously controlled as the loudspeakers to convert the analog signal into the acoustic wave signal to output.

When the working mode of the all-in-one machine is the non-touch control mode:

The low-power-consumption ultrasonic generating circuit 12 is switched on to control at least one second piezoelectric ceramic device of the output device 16 to generate and send the acoustic wave signal (e.g. the ultrasonic wave) with a preset frequency;

The input device 15 is configured for receiving the acoustic wave signal, converting the acoustic wave signal into the analog signal and sending the analog signal to the amplifying and filtering circuit 13, wherein the analog signal include: an ultrasonic analog signal with the preset frequency and/or an analog signal of a controlled sound, and an analog signal of an interfering sound;

The amplifying and filtering circuit 13 is configured for forming digital signal by processing the analog signal, and sending the digital signal to the signal processing device 14, wherein the digital signal is the digital signal obtained by carrying out amplifying and analog-to-digital conversion on the ultrasonic analog signal with the preset frequency and/or the analog signal of the controlled sound;

For example, in the amplifying and filtering circuit 13, the amplifying circuit 131 is configured for receiving the analog signal, processing the analog signal to obtain the amplified analog signal, and sending the amplified analog signal to the band-pass filter circuit 132; the band-pass filter circuit 132 filters the amplified analog signal to obtain the filtered and amplified analog signal, and sends the filtered and amplified analog signal to the analog-to-digital conversion circuit 133; the analog-to-digital conversion circuit 133 converts the filtered and amplified analog signal into the digital signal, and sends the digital signal to the low-power-consumption digital audio processor 142;

The signal processing device 14 is configured for processing the received digital signal to form a low-power-consumption digital signal, and sends the low-power-consumption digital signal to the main control integrated circuit 11, wherein the low-power-consumption digital audio processor 142 in the signal processing device 14 processes the digital signal to form the low-power-consumption digital signal;

The main control integrated circuit 11 is configured for judging whether an ultrasonic digital signal is included in the low-power-consumption digital signal, comparing whether the frequency of the ultrasonic digital signal is the same with the preset frequency if the ultrasonic digital signal is included in the low-power-consumption digital signal, and determining a generation position of the ultrasonic wave corresponding to the ultrasonic digital signal if the frequency of the ultrasonic digital signal is different from the preset frequency, wherein the main control integrated circuit 11 judging whether the ultrasonic digital signal is included in the low-power-consumption digital signal, for example, is performed as: the main control integrated circuit 11 judging whether the ultrasonic digital signal is included in the low-power-consumption digital signal according to the frequency of the ultrasonic wave and/or the controlled sound.

Figure 4:
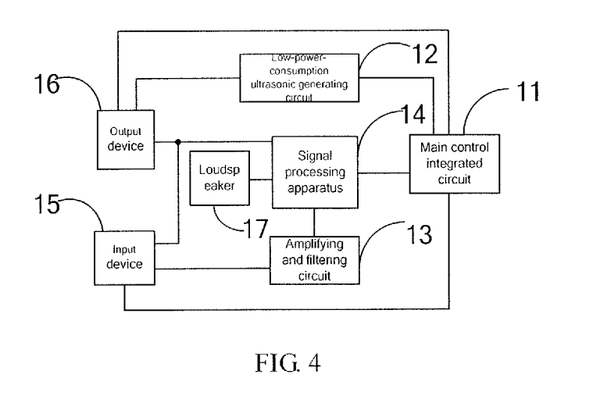
FIG. 4 is a structural schematic diagram of another non-touch control all-in-one machine provided by an embodiment of the present disclosure.

With reference to FIG. 4, the all-in-one machine further comprises a loudspeaker 17. The loudspeaker 17 is configured for receiving the amplified audio which is sent by the signal processing device 14, and outputting the amplified audio as an acoustic wave signal.

Figure 5:
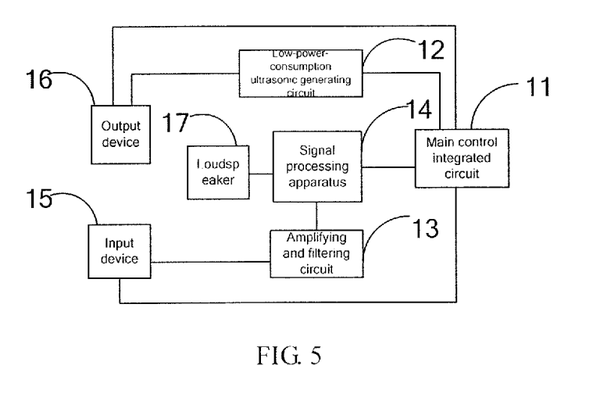
FIG. 5 is a structural schematic diagram of yet another non-touch control all-in-one machine provided by an embodiment of the present disclosure.

It should be noted that under a condition that the all-in-one machine comprises the loudspeaker 17, when the working mode is the loudspeaker mode, the analog signal output by the audio output circuit 141 can be only sent to the loudspeaker 17 without being sent to the input device 15 and/or the output device 16, as shown in FIG. 5. The structure has an advantage that mode control of the main control integrated circuit to the piezoelectric ceramic device in the input device 15 and/or the output device 16 can be omitted.

Figure 6:
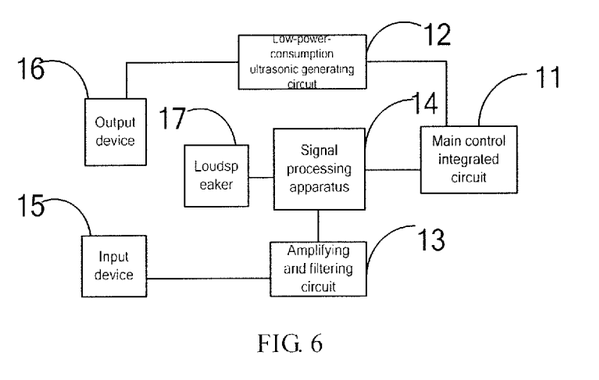
FIG. 6 is a structural schematic diagram of yet another non-touch control all-in-one machine provided by an embodiment of the present disclosure.

For example, in another embodiment, with reference to FIG. 6, the first piezoelectric ceramic device of the input device 15 is manufactured to have the acoustic-electro conversion mode, and the second piezoelectric ceramic device of the output device 16 is manufactured to have the electro-acoustic conversion mode. In this case, when the working mode of the all-in-one machine is the non-touch control mode, control of the main control integrated circuit to the input device 15 and the output device 16 can be omitted, and a corresponding connection structure can be referred to FIG. 6. The all-in-one machine provided by the embodiment of the present disclosure further comprises the loudspeaker which is configured for replacing the input device and/or the output device to directly output the audio when the working mode of the all-in-one machine is the loudspeaker mode.

From the above, according to the non-touch control all-in-one machine provided by the embodiment of the present disclosure, when the main control integrated circuit determines the all-in-one machine is in the loudspeaker mode, the audio is sent to the signal processing device, then is sent to the input device and/or the output device after being amplified by the signal processing device, and is output by the input device and/or the output device, thereby achieving the loudspeaker working mode of the all-in-one machine; and when the main control integrated circuit determines the all-in-one machine is in the non-touch control mode, the low-power-consumption ultrasonic generating circuit is configured for controlling the output device to generate and send the ultrasonic wave with the preset frequency, so that the input device receives the acoustic wave signal, the acoustic wave signal is converted into the digital signal after processed by the amplifying and filtering circuit and the signal processing device, the digital signal is sent to the main control integrated circuit, and the main control integrated circuit, according to analysis on the digital signal, judges whether the ultrasonic digital signal is included the digital signal, and if yes, determines the generation position of the ultrasonic wave according to the frequency of the ultrasonic digital signal so as to determine the position of the gesture, thereby achieving user command input and completing the non-touch control mode of the all-in-one machine.

A connection relationship of respective modules in the all-in-one machine will be introduced in details in the following.

With reference to FIG. 3, a first end A1 of the main control integrated circuit 11 is connected to a first end B2 of the low-power-consumption ultrasonic generating circuit 12 for controlling switching-on and switching-off of the low-power-consumption ultrasonic generating circuit 12; a second end A2 of the main control integrated circuit 11 is connected with the input device 15 for controlling the first piezoelectric ceramic device(s) of the input device 15; a third end A3 of the main control integrated circuit 11 is connected with the output device 16 for controlling the second piezoelectric ceramic device(s) of the output device 16; and a fourth end A4 of the main control integrated circuit 11 is connected with a first end C1 of the signal processing device 14 for sending the audio to the signal processing device 14, or receiving the low-power-consumption digital signal sent by the signal processing device 14.

A first end B1 of the low-power-consumption ultrasonic generating circuit 12 is connected with the main control integrated circuit 11; and the second end B2 of the low-power-consumption ultrasonic generating circuit 12 is connected with the output device 16 for controlling the second piezoelectric ceramic device(s) of the output device 16 to generate and send the ultrasonic wave with the preset frequency.

A first end D1 of the amplifying and filtering circuit 13 is connected with a first end E1 of the input device 15 for receiving the analog signal sent by the input device 15; and a second end D2 of the amplifying and filtering circuit 13 is connected with the signal processing device 14 for sending the digital signal to the signal processing device 14.

The first end C1 of the signal processing device 14 is connected with the fourth end A4 of the main control integrated circuit 11 for sending the low-power-consumption digital signal to the main control integrated circuit 11, and a second end C2 of the signal processing device 14 is connected with the input device 15 and/or the output device 16 so that the amplified audio is converted into the acoustic wave signal by the input device and/or the output device to output.

The first end E1 of the input device 15 is connected with the first end D1 of the amplifying and filtering circuit 13 for sending the analog signal to the amplifying and filtering circuit 13; a second end E2 of the input device 15 is connected with the signal processing device 14 for receiving the amplified audio which is sent by the signal processing device 14; and a third end E3 of the input device 15 is connected with the second end A2 of the main control integrated circuit 11; and The output device 16 is connected with the main control integrated circuit 11, and is also connected with the low-power-consumption ultrasonic generating circuit 12, Wherein the first end C1 of the signal processing device 14 is connected with an input/output end F of the low-power-consumption digital audio processor 142, and the second end C2 of the signal processing device 14 is connected with an output end G of the audio output circuit 141; the first end D1 of the amplifying and filtering circuit 13 is connected with an input end H of the amplifying circuit 131; and a second end D2 of the amplifying and filtering circuit 13 is connected with an output end 1 of the analog-to-digital conversion circuit 133, and the band-pass filter circuit 132 is connected between the amplifying circuit 131 and the analog-to-digital conversion circuit 133.

It is understandable that connection between the respective modules can be achieved in a wireless communication mode.

Figure 7:
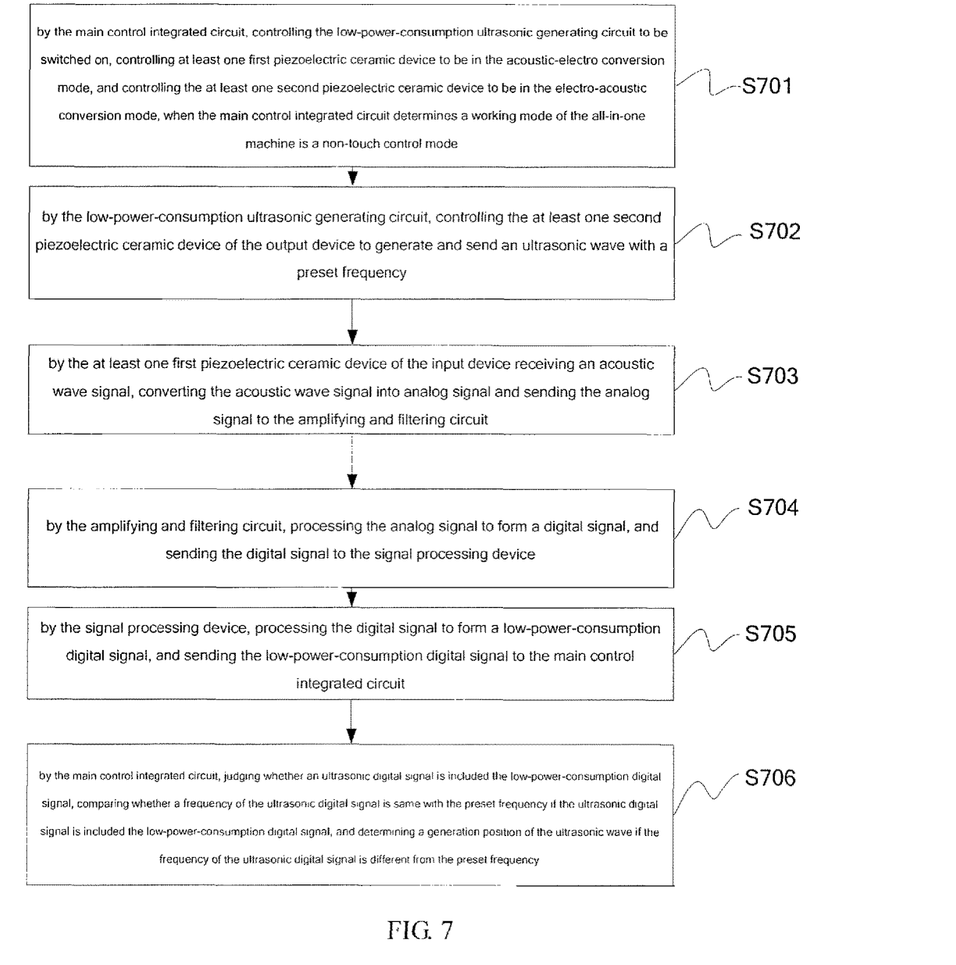
FIG. 7 is a flow chart of a method for controlling the non-touch control all-in-one machine provided by an embodiment of the present disclosure.

By using the non-touch control all-in-one machine provided by the embodiment of the present disclosure, with reference to FIG. 7, the embodiment of the present disclosure provides a method for controlling the all-in-one machine, comprising:

S701: by the main control integrated circuit, controlling the low-power-consumption ultrasonic generating circuit to be switched on, controlling the at least one first piezoelectric ceramic device to be in the acoustic-electro conversion mode, and controlling the at least one second piezoelectric ceramic device to be in the electro-acoustic conversion mode, when the main control integrated circuit determines a working mode of the all-in-one machine is a non-touch control mode;

S702: by the low-power-consumption ultrasonic generating circuit, controlling the at least one second piezoelectric ceramic device of the output device to generate and send an ultrasonic wave with a preset frequency;

S703: by the at least one first piezoelectric ceramic device of the input device receiving an acoustic wave signal, converting the acoustic wave signal into analog signal and sending the analog signal to the amplifying and filtering circuit;

S704: by the amplifying and filtering circuit, processing the analog signal to form a digital signal, and sending the digital signal to the signal processing device;

S705: by the signal processing device, processing the digital signal to form a low-power-consumption digital signal, and sending the low-power-consumption digital signal to the main control integrated circuit; and S706: by the main control integrated circuit, judging whether an ultrasonic digital signal is included the low-power-consumption digital signal, comparing whether a frequency of the ultrasonic digital signal is same with the preset frequency if the ultrasonic digital signal is included the low-power-consumption digital signal, and determining a generation position of the ultrasonic wave if the frequency of the ultrasonic digital signal is different from the preset frequency.

According to the method for controlling the non-touch control all-in-one machine, which is provided by the embodiment of the present disclosure, when the main control integrated circuit determines that the working mode of the all-in-one machine is the non-touch control mode, firstly, the low-power-consumption ultrasonic generating circuit is controlled to be switched on, the first piezoelectric ceramic device are controlled to be in an acoustic-electro conversion mode, and the second piezoelectric ceramic device are controlled to be in an electro-acoustic conversion mode; secondly, the low-power-consumption ultrasonic generating circuit controls the output device to generate and send the ultrasonic wave with the preset frequency; and then, after the input device receives the acoustic wave signal, the acoustic wave signal is converted into the digital signal by processing of the amplifying and filtering circuit and the signal processing device, and the digital signal is sent to the main control integrated circuit; and finally, the main control integrated circuit, according to frequency characteristics of the ultrasonic wave and sound, extracts the ultrasonic wave from the received digital signal, and determines a position where the ultrasonic wave is changed due to a gesture action when determining the frequency of the ultrasonic wave is different from the preset frequency, thereby determining user command input corresponding to the position.

For example, the control method further comprises:

by the main control integrated circuit, controlling the low-power-consumption ultrasonic generating circuit to be switched off, controlling the at least one first piezoelectric ceramic device and the at least one second piezoelectric ceramic device to be in the electro-acoustic conversion mode, and sending an audio to the signal processing device, when the main control integrated circuit determines the working mode of the all-in-one machine is a loudspeaker mode; and by the signal processing device, outputting the audio through the input device and/or the output device, after carrying out amplifying processing on the audio.

A working process of the non-touch control all-in-one machine is described by the embodiments in the following.

First Embodiment

Figure 8:
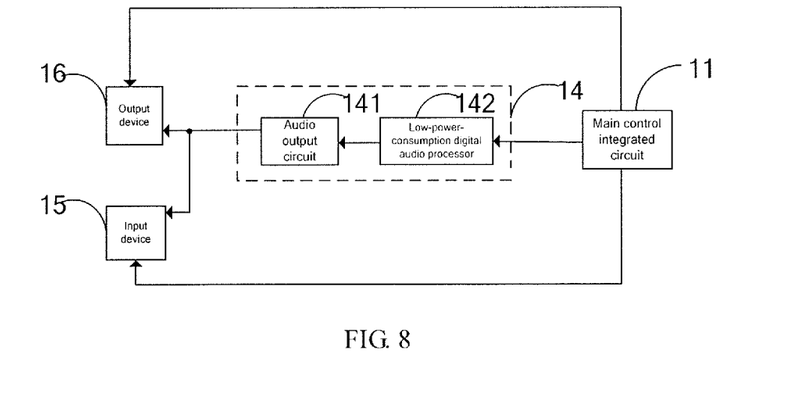
FIG. 8 is a signal transmission flow schematic diagram of a loudspeaker mode of the non-touch control all-in-one machine provided by an embodiment of the present disclosure.

When the main control integrated circuit 11 determines the working mode of the all-in-one machine is the loudspeaker mode, the working process of the all-in-one machine can be referred to FIG. 8:

The main control integrated circuit 11 controls the piezoelectric ceramic device(s) in the input device 15 and/or the output device 16 to be in the electro-acoustic conversion mode, and when determining an audio to be output, the main control integrated circuit 11 sends the audio to the low-power-consumption digital audio processor 142;

The low-power-consumption digital audio processor 142 receives the audio, amplifies the audio, and sends the amplified audio to the audio output circuit 141;

The audio output circuit 141 receives the amplified audio, converts the amplified audio into the analog signal, and sends the analog signal to the input device 15 and/or the output device 16; and The input device 15 and/or the output device 16 output(s) the analog signal.

Second Embodiment

Figure 9:
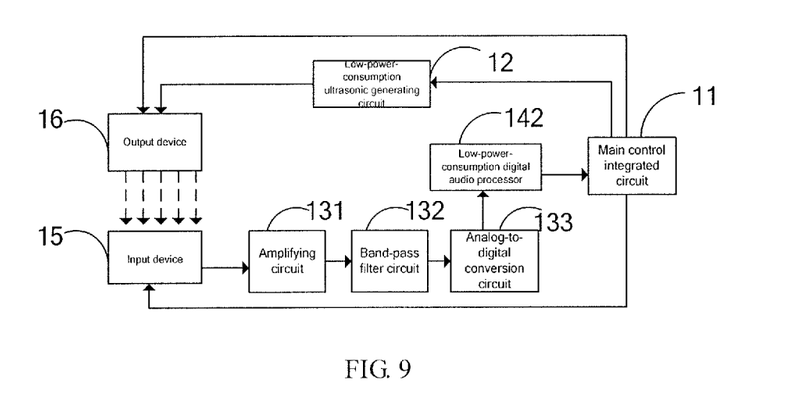
FIG. 9 is a signal transmission flow schematic diagram of a non-touch control mode of one non-touch control all-in-one machine provided by the embodiment of the present disclosure.

When the main control integrated circuit 11 determines the working mode of the all-in-one machine is the non-touch control mode, the working process of the all-in-one machine can be referred to FIG. 9;

The main control integrated circuit 11 controls the low-power-consumption ultrasonic generating circuit 12 to be switched on, and the main control integrated circuit 11 controls the first piezoelectric ceramic device in the input device 15 to be in the acoustic-electro conversion mode, and controls the second piezoelectric ceramic device in the output device 16 to be in the electro-acoustic conversion mode;

The low-power-consumption ultrasonic generating circuit 12 sends a control signal to the output device 16 for controlling the second piezoelectric ceramic device(s) in the output device 16 to generate the ultrasonic wave with the preset frequency;

After receiving the control signal, the second piezoelectric ceramic device(s) in the output device 16 generate the ultrasonic wave with the preset frequency;

When no gesture action occurs in the detection region between the input device 15 and the output device 16, the input device 15 receives the ultrasonic wave with the preset frequency, which is sent by the output device 16; and when the gesture action occurs in the detection region, the frequency of the ultrasonic wave with the preset frequency will be changed due to influence of the gesture, the frequency of the ultrasonic wave received by the input device 15 is changed, the input device 15 simultaneously receives controlled sound and outside interfering sound. That is, the acoustic signal received by the input device 15 includes ultrasonic wave, controlled sound and outside interfering sound. for example, the frequency of the ultrasonic wave is 80 KHZ, and a frequency of the controlled sound is 500 HZ to 3 KHZ;

The input device 15 converts the acoustic wave signal into analog signal and sends the analog signal to the amplifying circuit 131;

The amplifying circuit 131 receives the analog signal, amplifies the analog signal and then sends the amplified analog signal to a band-pass filter circuit 132;

The band-pass filter circuit 132 filters out interference from the received amplified analog signal according to different acoustic wave frequencies, and sends the filtered analog signal to the analog-to-digital conversion circuit 133;

The analog-to-digital conversion circuit 133 converts the received filtered analog signal into digital signal, and sends the digital signal to the low-power-consumption digital audio processor 142;

The low-power-consumption digital audio processor 142 converts the received digital signal into low-power-consumption digital signal, and sends the low-power-consumption digital signal to the main control integrated circuit 11. For example, the digital signal sent by the analog-to-digital conversion circuit 133 is a high-power digital signal. However, an input signal of the main control integrated circuit 11 has a power range. In order to enable power of the input signal not to exceed the power range, the digital signal sent by the analog-to-digital conversion circuit 133 need to be converted into the low-power-consumption digital signal, and then the low-power-consumption digital signal is sent to the main control integrated circuit 11;

The main control integrated circuit 11 judges whether an ultrasonic digital signal is included in the received low-power-consumption digital signal, compares whether a frequency of the ultrasonic wave is the same with the preset frequency of the ultrasonic wave sent by the output device if the ultrasonic digital signal is included in the received low-power-consumption digital signal, and determines, according to a position of the ultrasonic wave in the received acoustic wave signal, a position of the gesture which changes the ultrasonic wave if the frequency of the ultrasonic wave is different from the preset frequency of the ultrasonic wave sent by the output device, thereby determining an input command corresponding to the gesture.

From the above, the non-touch control all-in-one machine provided by the embodiment of the present disclosure comprises the main control integrated circuit, the low-power-consumption ultrasonic generating circuit, the amplifying and filtering circuit, the signal processing device, the input device consisting of at least one first piezoelectric ceramic device, and the output device consisting of at least one second piezoelectric ceramic device. When the main control integrated circuit determines the working mode of the all-in-one machine is the loudspeaker mode, the low-power-consumption ultrasonic generating circuit is controlled to be switched off by the main control integrated circuit, the first piezoelectric ceramic device(s) and/or the second piezoelectric ceramic device(s) is/are controlled to be in the electro-acoustic conversion mode, and the audio is sent to the signal processing device, is amplified by the signal processing device, and is output by the input device and/or the output device; when the main control integrated circuit determines the all-in-one machine is in the non-touch control mode, by controlling the low-power-consumption ultrasonic generating circuit to be switched on, controlling the first piezoelectric ceramic device(s) to be in the acoustic-electro conversion mode, and controlling the second piezoelectric ceramic device(s) to be in the electro-acoustic conversion mode, the second piezoelectric ceramic device is used as ultrasonic generating apparatus, the first piezoelectric ceramic device is used as acoustic wave signal receiving apparatus, the acoustic wave signal received by the input device are converted into digital signal by processing of the amplifying and filtering circuit and the signal processing device, the digital signal is sent to the main control integrated circuit, and the main control integrated circuit, according to frequency characteristics of the ultrasonic wave and sound, extracts the ultrasonic wave from the received digital signal, and determines the position where the ultrasonic wave is changed due to the gesture action when determining the frequency of the ultrasonic wave is different from the preset frequency, thereby determining user command input corresponding to the position. Therefore, under the condition of not adding the external device and not using the touch screen, the position of the gesture is tracked, so that cost of the device is reduced, and aesthetics of the device is improved.

It is evident that one person skilled in the art can make various changes or modifications to the present invention without departure from the spirit and scope of the invention. Thus, if these changes and modifications to the present invention are within the scope of the claims of the present invention and equivalent technologies, the present invention also intends to include all such changes and modifications within its scope.

The application claims priority of Chinese Patent Application No. 201510282889.1 filed on May 28, 2015, the disclosure of which is incorporated herein by reference in its entirety as part of the present application.

The invention claimed is:

1. A non-touch control apparatus, comprising: a main control integrated circuit, an ultrasonic generating circuit, a first transducer device and a second transducer device, wherein
the main control integrated circuit is configured to, in response to a condition that the apparatus is in a non-touch control mode, switch on the ultrasonic generating circuit so as to control the second transducer device to send out a first acoustic wave signal, the ultrasonic generating circuit is a low-power-consumption ultrasonic generating circuit,
the first transducer device is configured to be capable of receiving a second acoustic wave signal including the first acoustic wave signal, converting the second acoustic wave signal into a first electric signal, and outputting the first electric signal, the first electric signal is an analog signal, wherein, the main control integrated circuit is configured to be capable of receiving a second electric signal derived from the first electric signal,
wherein, the non-touch control apparatus further comprises:
an amplifying and filtering circuit, configured to receive the first electric signal output by the first transducer device, perform amplification, filtering and analog-to-digital conversion processing for the first electric signal, and output a third electric signal, wherein the third electric signal is digital signal, and the second electric signal is derived from the third electric signal, and
a signal processing device, configured to receive the third electric signal output by the amplifying and filtering circuit and process the third electric signal into the second electric signal for output, wherein, the second electric signal is digital signal, and power of the second electric signal is lower than that of the third electric signal,
wherein the main control integrated circuit is configured to, in response to the condition that the apparatus is in a loudspeaker mode, send an audio to the signal processing device, and the signal processing device is configured to output the audio by the first transducer device and/or the second first transducer device after carrying out amplifying processing for the audio;
the low-power-consumption ultrasonic generating circuit, in response to the condition that the apparatus is in the non-touch control mode, controls the at least one second piezoelectric ceramic device of the second transducer device to generate and send the first acoustic wave signal; the first acoustic wave signal includes an ultrasonic wave with a preset frequency; the at least one first piezoelectric ceramic device of the first transducer device is configured for receiving the second acoustic wave signal, converting the second acoustic wave signal into the first electric signal and sending the first electric signal to the amplifying and filtering circuit; the amplifying and filtering circuit is configured for forming the third electric signal after processing the first electric signal, and sending the third electric signal to the signal processing device; the signal processing device is configured for forming the second electric signal after processing the third electric signal, and sending the second electric signal to the main control integrated circuit; the main control integrated circuit is configured for judging whether an ultrasonic electric signal is included in the second electric signal, in response to a result that the ultrasonic electric signal is included the second electric signal, comparing whether a frequency of a ultrasonic wave which the ultrasonic electric signal is resulted from is the same with the preset frequency, and in response to a result that the frequency of the ultrasonic wave which the ultrasonic electric signal is different from the preset frequency, determining a generation position of an ultrasonic wave corresponding to the ultrasonic electric signal.

2. The apparatus according to claim 1, wherein the main control integrated circuit is configured to, in response to the condition that the apparatus is in the non-touch control mode, control the ultrasonic generating circuit to be switched off.

3. The apparatus according to claim 1, wherein the main control integrated circuit is configured to, in response to a condition that the apparatus is in a loudspeaker mode, control the first transducer device and/or the second transducer device to be in an electro-acoustic conversion mode.

4. The apparatus according to claim 1, wherein the second acoustic wave signal further includes: controlled sound, and interfering sound; and
the third electric signal is obtained by amplifying electric signal corresponding to the ultrasonic wave with the preset frequency and/or the controlled sound.

5. The apparatus according to claim 1, wherein, the main control integrated circuit judging whether the ultrasonic electric signal is included in the second electric signal includes:
the main control integrated circuit judging whether the ultrasonic electric signal is included in the second electric signal according to the frequency of the ultrasonic wave.

6. The apparatus according to claim 1, wherein the signal processing device includes: an audio output circuit and a low-power-consumption digital audio processor; and
the amplifying and filtering circuit includes: an amplifying circuit, a band-pass filter circuit and an analog-to-digital conversion circuit.

7. The apparatus according to claim 6, wherein the low-power-consumption digital audio processor is configured to, in response to the condition that the apparatus is in the loudspeaker mode, form an amplified audio after carrying out amplifying processing on the received audio and send the amplified audio to the audio output circuit, and in response to the condition that the apparatus is in the non-touch control mode, form the second electric signal after processing the third electric signal and send the second electric signal to the main control integrated circuit;
the audio output circuit is configured to, in response to the condition that the apparatus is in the loudspeaker mode, convert the amplified audio into an analog signal and send the analog signal to the first transducer device and/or the second transducer device; and the first transducer device and/or the second transducer device is(are) configured for outputting the analog signal.

8. The apparatus according to claim 7, wherein under the condition that a working mode of the apparatus is the non-touch control mode, the first transducer device is configured for receiving the second acoustic wave signal, converting the second acoustic wave signal into the first electric signal and sending the first electric signal to the amplifying and filtering circuit;

the amplifying and filtering circuit is configured for receiving the first electric signal, processing the first electric signal to obtain the amplified first electric signal, and sending the amplified first electric signal to the band-pass filter circuit;

the band-pass filter circuit is configured for filtering the amplified first electric signal to obtain a filtered amplified first electric signal, and sending the filtered amplified first electric signal to the analog-to-digital conversion circuit; and the analog-to-digital conversion circuit is configured for converting the filtered and amplified first electric signal into the third electric signal, and sending the third electric signal to the low-power-consumption digital audio processor.

9. The apparatus according to claim 1, further comprising: a loudspeaker in communicative connection with the signal processing device.

10. The apparatus according to claim 9, wherein under the condition that the apparatus is in the loudspeaker mode, the signal processing device is further configured for transmitting the audio to the loudspeaker after carrying out amplifying processing on the audio.

11. A method for controlling the non-touch control apparatus according to claim 1, comprising:

by the main control integrated circuit, switching on the ultrasonic generating circuit, when the apparatus is in a non-touch control mode;

by the ultrasonic generating circuit, controlling the second transducer device to generate and send a first acoustic wave signal;

by the first transducer device, receiving acoustic wave signal, converting the acoustic wave signal into the first electric signal, and outputting the first electric signal; and by the main control integrated circuit, receiving second electric signal derived from the first electric signal, judging whether an ultrasonic electric signal is included in the second electric signal, comparing whether a frequency of the ultrasonic electric signal is the same with a preset frequency if the ultrasonic electric signal is included in the second electric signal, and determining a generation position of the ultrasonic wave corresponding to the ultrasonic electric wave if the frequency of the ultrasonic electric signal is different from the preset frequency.

12. The method according to claim 11, further comprising:

by the main control integrated circuit, controlling the ultrasonic generating circuit to be switched off, controlling the first transducer device and/or the second transducer device to be in an electro-acoustic conversion mode, and sending an audio to the signal processing device, under the condition that the main control integrated circuit determines a working mode of the apparatus is a loudspeaker mode; and by the signal processing device, transmitting the audio to the first transducer device and/or the second transducer device, after carrying out amplifying processing on the audio.

13. A non-touch control apparatus, comprising: a main control integrated circuit, an ultrasonic generating circuit, a first transducer device and a second transducer device, wherein the main control integrated circuit is configured to, in response to a condition that the apparatus is in a non-touch control mode, switch on the ultrasonic generating circuit so as to control the second transducer device to send out a first acoustic wave signal, the ultrasonic generating circuit is a low-power-consumption ultrasonic generating circuit, the first transducer device is configured to be capable of receiving a second acoustic wave signal including the first acoustic wave signal, converting the second acoustic wave signal into a first electric signal, and outputting the first electric signal, the first electric signal is an analog signal, wherein, the main control integrated circuit is configured to be capable of receiving a second electric signal derived from the first electric signal, wherein, the non-touch control apparatus further comprises:

an amplifying and filtering circuit, configured to receive the first electric signal output by the first transducer device, perform amplification, filtering and analog-to-digital conversion processing for the first electric signal, and output a third electric signal, wherein the third electric signal is digital signal, and the second electric signal is derived from the third electric signal, and a signal processing device, configured to receive the third electric signal output by the amplifying and filtering circuit and process the third electric signal into the second electric signal for output, wherein, the second electric signal is digital signal, and power of the second electric signal is lower than that of the third electric signal, wherein, the signal processing device includes: an audio output circuit and a low-power-consumption digital audio processor; and the amplifying and filtering circuit includes: an amplifying circuit, a band-pass filter circuit and an analog-to-digital conversion circuit wherein the low-power-consumption digital audio processor is configured to, in response to the condition that the apparatus is in a loudspeaker mode, form an amplified audio after carrying out amplifying processing on the received audio and send the amplified audio to the audio output circuit, and in response to the condition that the apparatus is in the non-touch control mode, form the second electric signal after processing the third electric signal and send the second electric signal to the main control integrated circuit;

the audio output circuit is configured to, in response to the condition that the apparatus is in the loudspeaker mode, convert the amplified audio into an analog signal and send the analog signal to the first transducer device and/or the second transducer device; and the first transducer device and/or the second transducer device is(are) configured for outputting the analog signal, wherein the main control integrated circuit, in response to the condition that the apparatus is in the loudspeaker mode, controls the low-power-consumption ultrasonic generating circuit to be switched off by a first end of the main control integrated circuit, controls the at least one first piezoelectric ceramic device and/or the at least one second piezoelectric ceramic device to be in the electro-acoustic conversion mode by a second end and/or a third end of the main control integrated circuit respectively, and sends the audio to the signal processing device by a fourth end of the main control integrated circuit; after amplifying the audio, the signal processing device transmits the amplified audio to the first transducer device and/or the second transducer device by a second end of the signal processing device;

the main control integrated circuit, in response to the condition that the apparatus is in the non-touch control mode, controls the low-power-consumption ultrasonic generating circuit to be switched on by the first end of the main control integrated circuit, controls the at least one first piezoelectric ceramic device of the first transducer device to be in an acoustic-electro conversion mode by the second end of the main control integrated circuit, and controls the at least one second piezoelectric ceramic device of the second transducer device to be in the electro-acoustic conversion mode by the third end of the main control integrated circuit; the low-power-consumption ultrasonic generating circuit controls the at least one second piezoelectric ceramic device of the second transducer device to generate and send the ultrasonic wave with the preset frequency as the first acoustic wave signal, by a second end of the low-power-consumption ultrasonic generating circuit;

at least one first piezoelectric ceramic device of the first transducer device receives the second acoustic wave signal, converts the second acoustic wave signal into the first electric signal, and sends the first electric signal to the amplifying and filtering circuit by a first end of the first transducer device; the amplifying and filtering circuit processes the first electric signal to form the third electric signal, and sends the third electric signal to the signal processing device by a second end of the amplifying and filtering circuit; and the signal processing device processes the digital signal to form the second electric signal, and sends the second electric signal to the main control integrated circuit by a first end of the signal processing device.

14. The apparatus according to claim 13, wherein the first end of the signal processing device is connected with an input/output end of the low-power-consumption digital audio processor, the second end of the signal processing device is connected with an output end of the audio output circuit, and the audio output circuit is connected with the low-power-consumption digital audio processor.

15. The apparatus according to claim 13, wherein a first end of the amplifying and filtering circuit is connected with an input end of the amplifying circuit, the second end of the amplifying and filtering circuit is connected with an output end of the analog-to-digital conversion circuit, and the band-pass filter circuit is connected between the amplifying circuit and the analog-to-digital conversion circuit; and the first end of the first transducer device is connected with the first end of the amplifying and filtering circuit.

\* \* \* \* \*